United States Patent [19]

Bedford et al.

[11] 3,726,145
[45] Apr. 10, 1973

[54] APPARATUS FOR INDICATING MAGNITUDE OF VIBRATIONS

[75] Inventors: Edward F. Bedford, North Olmsted; Thomas C. Russo, Brookpark, both of Ohio

[73] Assignee: ATCO, Inc., Cleveland, Ohio

[22] Filed: June 18, 1970

[21] Appl. No.: 47,445

[52] U.S. Cl. ..........................73/457, 73/458, 73/462
[51] Int. Cl. ..........................G01m 1/22, G01m 1/28
[58] Field of Search......................73/71.2, 71.4, 487, 73/462, 457, 458

[56] References Cited

UNITED STATES PATENTS

| | | | |
|---|---|---|---|
| 2,780,939 | 2/1957 | Kellogg | 73/458 |
| 3,201,776 | 8/1965 | Morrow et al. | 73/71.4 X |
| 3,321,960 | 5/1967 | Bjorn | 73/487 X |
| 3,254,528 | 6/1966 | Michael | 73/71.4 |
| 3,030,796 | 4/1962 | MacMillan | 73/71.4 X |

OTHER PUBLICATIONS

A Text "Junction Transistor Electronics" By R. B. Hurley, 1958 John Wiley & Sons, Inc. Pages 49–53.

*Primary Examiner*—James J. Gill
*Attorney*—Fay, Sharpe and Mulholland

[57] ABSTRACT

A circuit and apparatus for detecting vibration in rotating parts and a method of using the circuit and apparatus which is particularly useful in connection with the balancing of wheels and tires on a vehicle. The circuit includes a sensor, preferably a seismic geophone, in circuit with a reverse-biased transistor. Means are provided in circuit with the input of the transistor for adjusting the range of response of the circuit to signals from the geophone. The output of the transistor is connected in circuit with a meter having a zero-adjusting circuit associated therewith. A capacitor is provided for damping the signals applied to the meter. The apparatus for using the meter in connection with a method of balancing wheels includes a portable probe for housing the geophone which may be magnetically secured to the body of the vehicle. A stable stand includes a triangularly shaped base member, an upstanding member, and means for adjustably securing a housing which incorporates the circuit according to the invention. The method of using such circuit and apparatus is also disclosed in connection with the method of balancing the tires and wheels on a vehicle.

13 Claims, 3 Drawing Figures

PATENTED APR 10 1973 3,726,145

INVENTORS
EDWARD F. BEDFORD &
THOMAS C. RUSSO

BY Fay, Sharpe & Mulholland
ATTORNEYS

APPARATUS FOR INDICATING MAGNITUDE OF VIBRATIONS

BACKGROUND OF THE INVENTION

This invention relates to a highly sensitive circuit for use in combination with low level input signals for detecting the vibrations of rotating parts. More particularly, this invention relates to a circuit in combination with a seismic geophone and an apparatus for using the combination. Still more particularly, this invention relates to a circuit for detecting vibrations, an apparatus for housing the circuit, and a method for using the apparatus in connection with the detection of unbalance in the wheel and tires of the vehicle.

In the prior art, it has long been a problem in a wide variety of applications to detect and accurately assess the nature and magnitude of vibrations produced by rotating parts. For example, it is often desirable to detect the nature and magnitude of vibrations in rotating machinery so that corrective action may be taken to avoid operating the machinery at or near the resonant unbalance points. Operation at or near such points for sustained periods of time may cause irreparable injury to the machinery, and product an annoying sound level which may also be injurious to the operator of the machine.

A well known instance in which it is desired to determine and assess the degree of unbalance of rotating parts occurs in the art of detecting the degree of unbalance in an automobile wheel. There are a number of techniques which have been developed by service stations and garages which use a wide variety of wheel balancing apparatuses which have as their general aim the improvement of the accuracy in balancing while minimizing time-consuming manual labor. For example, the patent to Bjorn, U. S. Pat. No. 3,321,960, relates to such an apparatus together with a circuit apparently suitable for that apparatus. The patent to Pellicciotti, U. S. Pat. No. 3,238,786, is another example of a wheel unbalance measuring system which may be used to measure the degree of unbalance in a wheel and tire combination on a vehicle. Moreover, the patents to Allen, U.S. Pat. No. 2,656,713, Lash, U.S. Pat. No. 2,981,112, Germond, U.S. Pat. No. 2,009,997, and Greentree et al., U.S. Pat. No. 2,078,796 provide additional relevant background information for techniques and apparatuses for indicating the general unbalance of rotating bodies. Despite the number of solutions promulgated by the prior art, it has remained a continuing problem within the art to provide a circuit which may be used in combination with a highly sensitive sensing unit which is capable of detecting low frequency vibrations. Because of the garage and service shop environment in which such circuits are used, it is necessary that such circuits be simple and yet rugged because of the continuous movement and placement of the circuit in conjunction with the wheel balance apparatus and its method of use. Still further, it is desirable that such detection circuit avoid an external source of power so that they may be manipulated readily about the shop floor. But where such circuits are transistorized for use with batteries, it is also desirable that the quiescent drain on the battery be held to a minimum so that the circuits have long operating lives without the need for maintenance. Thus, it is an overall object of this invention to provide a circuit for use in combination with a sensitive input sensor for detecting vibrations, particularly those generated during the method of detecting vibrations using a wheel unbalance apparatus, and providing an output signal indicative thereof.

It is another object of such a circuit to include means for setting the zero adjustment on the meter which is independent of the operating point of the transistor.

Still further, it is an additional object of this invention to provide an apparatus suitable for use in a garage and service shop and to provide such an apparatus which is rugged and stable.

It is an additional object of this invention to provide a method for detecting the unbalance in a wheel and tire of a vehicle and taking appropriate corrective action.

These and other objects of this invention will become apparent from the written description of the invention taken together with the accompanying drawings.

BRIEF SUMMARY OF THE INVENTION

The circuit according to the invention includes a source of low level input signals generated by a seismic geophone. The input signals are provided to the base circuit of a reverse-biased germanium transistor for providing an output which is representative of the input signals. A meter is in series circuit with a resistor and a zero-setting potentiometer which are connected in parallel with a battery to minimize drain on the circuit and to provide means for adjusting the zero-setting on the meter while minimizing the effect of resistive heating in the meter. The apparatus for housing the circuit includes a triangular base member in combination with an upright member which includes means for storing a lead which is connected to a probe member. The probe member includes means for magnetically securing the sensor to the body of a vehicle. The upstanding member of the apparatus includes a generally U-shaped member which is adjustably secures a housing for the meter.

The method of using the circuit and the apparatus in conjunction with a commercially available wheel balancing apparatus includes the steps of securing a commercially available wheel adaptor to a wheel on the vehicle, fixing the probe housing the geophone on a vibration-sensitive -sensitive portion of the vehicle, spinning the wheel through a range of speed, observing the output from the circuit on the meter to detect the speed at which the vibration is at a maximum, and adjusting the weight distribution on the wheel adaptor while the wheel is at that speed until the output from the circuit is minimized, which indicates that the wheel and tire are approaching a condition of dynamic balance.

Preferably, the method is first performed when the circuit is set to provide its least sensitive response to input signals. After the wheel and tire have been initially balanced as indicated above, the circuit is set to provide a more sensitive response and the method is repeated. For the circuit of the invention, the method may be repeated a third time when the meter is set to provide its most sensitive response to input signals.

In any setting, the meter may be observed throughout a range of speeds encompassing the anticipated range of speeds for the vehicle and corrective action taken. This possibility allows the operator to achieve a dynamic balance over the full range of speeds for the vehicle.

DETAILED DESCRIPTION OF THE PREFERRED EMBODIMENT

Figure 1:
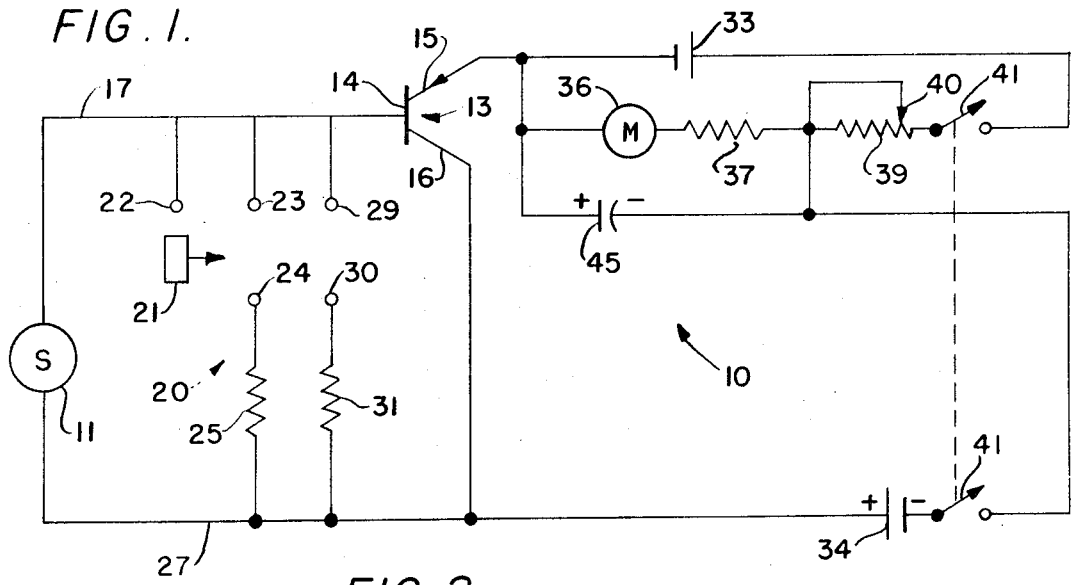
FIG. 1 is a detailed circuit diagram of the vibration sensing circuit according to the invention.

In FIG. 1, a highly sensitive circuit which is especially useful for detecting vibrations, such as those produced during a method of balancing wheels and tires on a vehicle, is designated generally by the reference numeral 10. A source 11 of input signals is connected to the base 14 of a reverse-biased transistor 13 by way of an input lead 17.

In order to provide a high sensitivity for use in a method of detecting vibrations, the source 11 preferably comprises a seismic geophone which is commercially available from Geospace Corporation, Houston, Texas. Such geophones are described in U. S. Pat. No. 3,119,978, the disclosure of which is herein incorporated by reference. It is preferred that the source 11 have a low input impedance, for example, less than 1 kilohm and preferably on the order of 300 ohms to avoid loading effects on the input circuit to the reverse-biased transistor 13. In the specific embodiment using the geophone previously described, the impedance of the source is about 300 ohms.

In order to be especially useful for use in connection with detecting vibrations, the source 11 is preferably provided as having a particular sensitivity to low frequencies. Such low frequency is particularly useful in detecting the vibrations produced by a vehicle wheel and tire unbalance since the human operator is particularly sensitive to such low frequency unbalance. The geophone of the specific embodiment has a natural frequency of 14 cycles per second so that it is particularly suitable for use in connection with the desired method. It is preferred that the input source 11 have a natural frequency in the range of about 10 to 40 cycles per second, and more particularly in the range of about 15 to 30 cycles per second, to detect most precisely the frequencies of vibration which are particularly sensitive to the human operator.

The geophone described in the specific embodiment has a low level output which is particularly suited for use in connection with the reverse-biased transistor 13. For example, for a geophone having a 14 cycle natural frequency, connected to a 1K load which closely approximates the input impedance of the reverse biased transistor 13, the output voltage from the geophone in volts per inch per second at a 7 cycle vibration is about 0.2 volts. At 15 cycles per second, the output is about 0.6 volts per inch per second, while at about 50 cycles per second the output is 0.5 volts per inch per second and remains at that level up to about 300 cycles per second. Thus, such a geophone is particularly appropriate for detecting the low frequency responses, while yet providing a relatively flat resonant curve over the range of vibration frequencies of particular interest, especially in connection with the method for balancing wheels and tires on a vehicle.

Another significant advantage of a sensor of the type described arises from the fact that such sensors detect not only vertical components of vibration, but also horizontal vibrations may be detected as well. Thus, the output from the geophone represents the detection of vibration having minute vertical components so that when corrective measures are taken, both horizontal and vertical vibrations are thus compensated.

An input switch, designated generally by the reference numeral 20, provides a range of sensitivity to the input signal from source 11 on lead 17 by the circuit 10 according to the invention. A selector switch 21 may be selectively connected in any one of three positions to provide a high, medium or low sensitivity for the circuit. When the switch 21 is connected to terminal 22, no shunting of the input signal source 11 on lead 17 occurs. This position provides the highest level of sensitivity for the circuit since the full magnitude of the input signal is connected to the base 14 of the transistor 13.

When the sensitivity selector switch 21 is connected between terminals 23 and 24, the resistor 25 is connected in shunt between the lead 17 and the common lead 27. In a specific embodiment, the resistor 25 is on the order of 1000 ohms to provide a middle range of sensitivity for the circuit during the wheel balancing process as will be discussed.

When the switch 21 is connected between terminals 29 and 30, the resistor 31 is connected in shunt between the leads 17 and 27 to provide the lowest sensitivity for the circuit. In a specific embodiment, the resistor 31 is on the order of 150 ohms to provide a greater shunting effect to the input signal on lead 17 than is provided by the resistor 25.

When detecting vibrations, the circuit 20 has been particularly useful in detecting the peak magnitude of the input signal over a wide range in circuit with the highly sensitive circuit 10 including the reverse-biased transistor 13. For example, if the output from the transistor 13 is greater than the output indicating device may tolerate accurately or safely, the range selector switch 21 may be quickly reset to a lower sensitivity. On the other hand, when the output from the transistor is low, the next higher sensitivity may be selected so that the highest sensitivity of the circuit may be used consistent with the needs of the user.

In addition, the capability of the circuit to switch between ranges is especially useful when the circuit 10 is used during the wheel balancing process, and steps are being taken to eliminate the unbalance such as by the selection of counterweights on a commercially available wheel adaptor. The various sensitivity ranges have been particularly useful in quickly permitting greater adjustment of sensitivity to eliminate the unbalance in the wheel when the circuit and the switch 21 is at its lowest condition and to make finer adjustments when the switch is connected in either of its medium or its high sensitivity positions. Such a circuit has thus materially increased the speed by which the wheel and tires of vehicles may be balanced as well as imparting a wide range of sensitivity to unbalance with the simple and economical circuit according to the invention.

The transistor 13 includes a base 14, an emitter 15, and a collector 16. The transistor 13 is reverse-biased by a battery 33 and a battery 34. As is well known, the first two letters of the NPN and PNP designation for a transistor indicate the relative polarities of the voltages applied to the emitter and the collector in normal operation. Thus, in an NPN transistor, the emitter is generally negatively biased with respect to both the collector and the base, while the collector is positively biased relative to the emitter and the base. Similarly, a PNP transistor is normally biased so that its emitter is made positive with respect to both its collector and base, while its collector is generally made negative with respect to both its emitter and its base.

However, contrary to normal applications, it has been found to be particularly appropriate in this application to use a transistor 13 which is reverse-biased, or in other words, biased in a manner opposite to the general practice. In most installations, reverse-biased transistors cannot be used because the input signal range is too large, thus running the risk of an inaccurate output from the circuit or overheating the transistors which eliminates their usefulness. However, in a reverse-biased mode, a transistor has a limited useful operable range which provides an output which is an extremely accurate representation of the input signal and which accommodates the low level of signal produced by a sensor such as the geophone described in the specific embodiment.

In this specific embodiment, the input range of signals which can be received by the transistor 13 is limited by the base-emitter breakdown voltage, which, for germanium transistors, is on the order of about 1.5 volts. While either PNP or NPN transistors may be used in the reverse-biased mode, the transistor 13 has been shown for purpose of illustration only as a PNP transistor. In addition, it is preferred that the transistor be germanium since silicon transistors have not been particularly suited to providing an output current which is useful in driving a meter for the purposes of the invention. In a specific embodiment a 2N408 germanium PNP alloy junction transistor was used to achieve the specific aims of this invention.

Thus, to provide the reverse-biasing for transistor 13, the battery 33 has its negative terminal connected to the emitter 15 while the battery 34 has its positive terminal connected to the collector 16 of the transistor 13.

Another significant advantage for utilizing a reverse-biased transistor in such a circuit is derived from the low quiescent and operating current drains involved. Because of the low current drains, batteries 33 and 34 have an increasingly long life, which, when used in connection with the embodiment in FIGS. 2 and 3, substantially decreases the maintenance problems caused by the need to change batteries, or to supply a source of power to the instrument.

Figure 2:
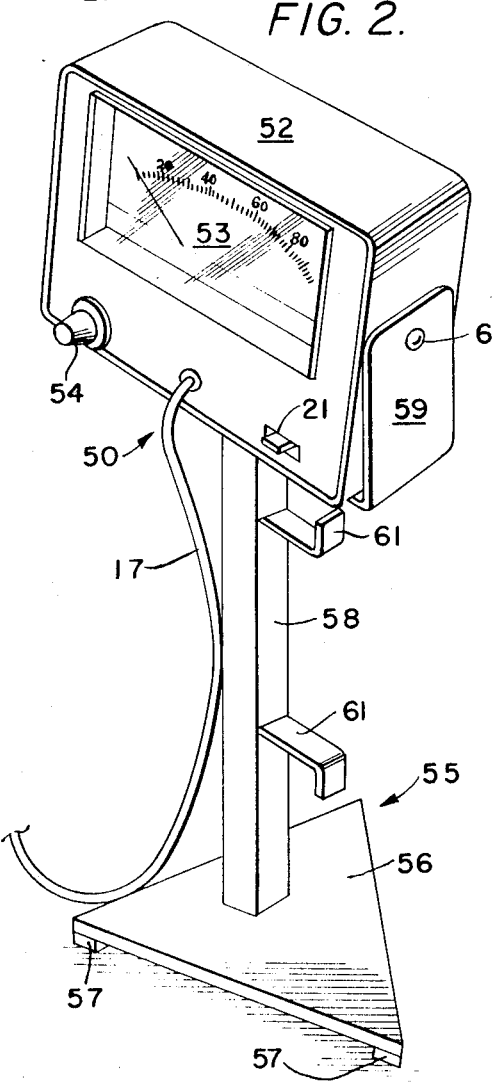
FIG. 2 illustrates the instrument housing the circuit of FIG. 1 adapted for use in connection with a method and apparatus for detecting vibrations.

Thus, the meter and stand of FIG. 2 have great mobility in that they are not required to be placed near a source of power and are not limited for purposes of transferability by such a source of power. This is a particularly significant advantage when the circuit of FIG. 1 and the apparatus of FIG. 2 is used in connection with the embodiment of FIG. 3 wherein the meter may be moved about the vehicle when balancing each wheel and tire on a vehicle on an individual basis.

The emitter 15 of the transistor 13 is also connected to an output meter 36 which is connected in series with a resistor 37. The resistor 37 is connected in series with a potentiometer 39 having a variable tap 40. The potentiometer 39 is connected in series with a switch 41. The meter 36, the resistor 37, the potentiometer 39 and the switch 41 together comprise a series circuit which is connected in parallel with the battery 33. Such a circuit arrangement provides a significant advantage in accurately setting the zero adjustment for the meter since the zero adjustment is accomplished without loading the meter by an output from the transistor 13. Such loading increases the heating effects caused by current flow through the internal resistance of the meter which produce inherent inaccuracies in the meter zero setting circuit described. The series circuit thus described is capable of back-biasing the meter to its zero position in the absence of an input signal.

In operation, the switch 41 is closed, and the variable tap 40 of a potentiometer 39 is adjusted until the indication on the meter 36 returns to its zero level. Preferably, the switch 41 and the potentiometer 39 are combined in a single switch which is commercially available. Such switches are used, for example, as the on-off and volume control switches on a radio. In a specific embodiment, the meter is a highly sensitive d'Arsonvaal movement meter having a 100 microampere full scale range connected in series with a 10K resistor which is in series with a 500K potentiometer across a 1.5 volt battery.

A capacitor 45 is connected in parallel with the meter 36 to provide damping for the meter. In a specific embodiment, a 10 microfarad capacitor is used to provide proper damping for the circuit without limiting or clipping the increases in output from the transistor 13. If insufficient damping is used, the output indication on the meter 36 may be too oscillatory to be of great value to the observer, while, on the other hand, if the degree of damping is to great the response time for the meter as determined by the RC time constant of the circuit is too slow to detect the effectiveness of corrective changes being made during the wheel balancing operation. Preferably, it has been found that a time constant of less than 1 second has been appropriate and that a time constant of about one-tenth of a second has worked even more satisfactorily.

A meter and stand are designated generally in FIG. 2 by the reference numeral 50. The meter 50 comprises a casing 52 which houses the circuit of FIG. 1. The faceplate of the 100 microampere meter 36 is shown at 53 while the control knob for the combination switch 41 and potentiometer 39 is designated by the reference numeral 54. The range adjustment switch is shown at 21 for adjusting the range of the circuit as previously described. The input lead for the circuit is designated as shown at 17 for providing the signals from the source 11 as previously described.

The meter stand is designated generally at 55 and comprises a base member 56 which is preferably triangular in shape for stability. Pads 57 are provided at each of the corners of the triangular base member 56 for added stability. Such a stability has been found advantageous since the meter is often subjected to relatively harsh treatment in its use during the wheel balancing process.

An upstanding member 58 is connected to the base member 56 and supports a generally U-shaped member 59 which cooperates with pins 60 so that the meter casing 52 may be angled relative to the vertical plane for easy viewing by the operator. A pair of generally L-shaped members 61 are secured to one side of the upstanding member 57 to provide a convenient storage space for the lead 17 when the instrument is not in use or for storing only a part of the lead 17 during use so that the lead 17 does not interfere with the freedom of movement of the operator about the instrument during the wheel balancing process.

Figure 3:
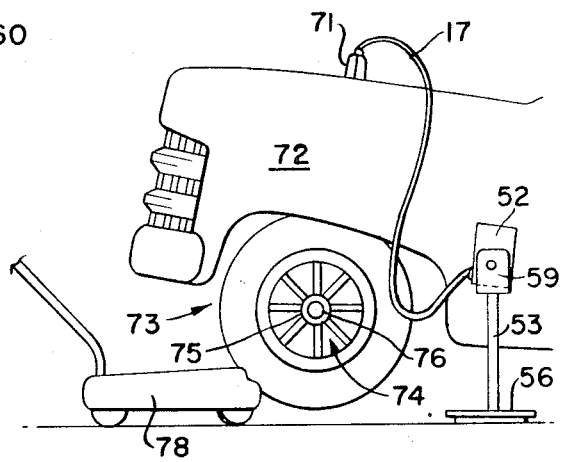
FIG. 3 illustrates the system according to the invention illustrating its use in connection with a method of dynamically balancing vehicle tires and wheels.

The use of the circuit of FIG. 1 and the instrument of FIG. 2 are shown in FIG. 3 in connection with the balancing of a tire and wheel. The source 11 of input signals is housed in a container 71 which is magnetically secured to a fender 72 of an automobile, here shown as the front left quarter panel of the vehicle. The casing 71 is preferably made from aluminum and has a relatively smooth finish with rounded corners to avoid marring the surface of the vehicle. As indicated, the vehicle 72 includes a wheel and tire combination 73. In order to balance the wheel and tire combination 73, a commercially available wheel balancing apparatus including a wheel adaptor 74 is employed. Such an apparatus, including the adapter 74 is commercially available from the Hunter Engineering Company, Bridgeton, Missouri, and is described in U. S. Pat. No. 2,565,233, the disclosure which is herein incorporated by reference, while the method of using such apparatus is described in the Hunter publication bearing the designation "Form 233T 10–68", the disclosure of which is also incorporated herein by reference.

In operation, the hubcap of the vehicle and tire combination is removed and the wheel adapter 74 is secured to the combination. The wheel adapter 74 has a central member 75 on which are mounted a plurality of weights 76 which are adjustable relative to the central axis of the adapter. An apparatus 78 is provided for spinning the wheel and tire combination 73 to simulate the dynamic operating conditions for the wheel and tire in normal use. The apparatus 78 is abutted adjacent to the wheel and tire combination 73 and the wheel is spun. When the wheel is slightly out of balance, vibrations are generated in the suspension system of the vehicle which are detected by the source 11 housed in the probe 71. The operator may view the output on the meter 53 to determine the severity of the unbalance. The weighted members 76 secured to the adapter 74 on the wheel 75 are adjusted to bring the wheel into balance by imparting a known amount of weight to the tire in such a magnitude and direction to bring the tire into balance.

In operation, the meter is preferably first set at its lowest sensitivity position, that is, with the switch 21 connected between terminals 29 and 30. The probe 71 is located and attached to a portion of the automobile fender 72. The meter and stand 50 are oriented so that the meter face 53 may be observed by the operator. It is an advantage of the invention to locate the circuit on the apparatus 50 in a substantially non-vibrating location so that the meter output may be accurately observed and the life of the meter is enhanced by avoiding vibrations.

The wheel is spun by the action of the spinner assembly 78 and the degree of unbalance is noted on the face of the meter 53. Since the weighted member 76 may be adjusted during the spinning operation to provide an indication of the magnitude and orientation of weight which will minimize unbalance, the initial or coarsest attempts at bringing the tire into balance are manipulated first. As the output of the meter decreases while switch 21 is set to the least sensitive, or coarse position, the operator is immediately apprised that the wheel is approaching balance. In this condition, relatively large steps in orienting and selecting weights may be taken to attempt to bring the wheel into balance.

The output of the meter when the switch 21 is in its coarse position achieves a low output, and the switch 21 may be changed to its intermediate position so that adjustment may be made to a finer degree. That is, the response from the circuit is greater for smaller changes in weight adjustment on member 76 when the meter is in its intermediate position. This process is then continued until the wheels and tires become dynamically balanced while the switch 21 is set to its "high" position or position of greatest sensitivity. In this manner, the tire and weight combination is effectively tuned over a wide range to provide the maximum accuracy for the adjustment. The magnitude and orientation of the noted adjustment of the wheel member 76 may then be used to determine the weight and location of weights to be mechanically secured to said tire which are necessary to maintain the minimum unbalance which was electronically sensed.

Another significant advantage of the embodiment shown is that the sensitivity of the circuit may be changed during the wheel balancing operation. It is often the case that at a particular speed, represented by the wheel and tire combination 73 being spun at a certain speed by the apparatus 78, the output from the probe 71 will be slight. However, even without adjustment, but at a different speed, the output may be substantial indicating a dynamic resonant condition at a particular speed. Thus, the circuit according to the invention permits an easy switching between ranges as the speed of operation of the tire changes so that the operator may observe that condition without the meter output going off scale.

By this method, the maximum output or degree of unbalance for a particular speed in a range of speeds for the tire and wheel combination may be ascertained. Thus, a method and apparatus for measuring the unbalance of a vehicle wheel and tire combination have been described.

The method and apparatus may also be used to check the dynamic balance of a wheel and tire combination which have been previously statically balanced or dynamically balanced while off the vehicle. The method and apparatus are thus used to bring about a dynamic balance for the wheel and tire combination in conjunction with the vehicle.

Still another use for the circuit and apparatus is for checking the magnitude of vibrations during the tuning operation. Such an indication may represent that the engine is out of tune, or that rotating parts of the engine are producing an inordinate amount of vibration.

During any of its uses, it may be observed that the output of the meter rarely, if ever, goes to zero in the most sensitive mode because of the inherent sensitivity of the circuit. Thus, minimizing the output indicated on the meter achieves the aims of the invention.

It will be understood, of course, that modifications can be made in the preferred embodiments of the invention described and illustrated herein without departing from the scope and purview of the appended claims.

We claim:

1. An apparatus including a circuit for sensing vibrations and providing an output representation of said vibrations comprising:
   a source of low level electrical input signals which are a first representation of said vibrations;
   transistor amplifying means comprising a transistor which includes a base, an emitter and a collector, said base being in circuit with said input signals;
   means for reverse-biasing the emitter and the collector of said transistor so that said transistor provides a second representation of said input signals for input signals having a level between zero volts and a voltage determined by the emitter-base breakdown voltage of said transistor means;
   means including a meter in circuit with said transistor for providing an output representation of the input signals from said source; and
   zero-setting means for adjusting the response of said meter to the second representation of said input signals from said transistor so that said meter provides a zero output representation in the absence of said input signals from said source.

2. The circuit as defined in claim 1 further including adjustable level-setting means in circuit with said source and said transistor for selecting the magnitude of said input signals which are applied to the base of said transistor.

3. The circuit as defined in claim 2 wherein said source is further characterized as being capable of providing said electrical signals which are a first representation of vibrations having relatively vertical and horizontal components.

4. The circuit as defined in claim 3 wherein said vibrations are produced by the rotation of an automobile tire and wheel and said source is a seismic geophone adapted to be portably located on a portion of an automobile which is responsive to said vibrations produced by the rotation of a tire and wheel on said automobile.

5. The circuit as defined in claim 4 wherein said adjustable level setting means includes:
   means for providing a selected impedance in shunt with the input signals produced by said geophone; and
   switch means for selectively inserting one of said selected impedances in shunt with said input signals whereby a plurality of ranges of response to said input signals by said circuit are provided so that one of said plurality of ranges may be more effectively utilized with a relatively greater input signal than another of said plurality of ranges may be utilized with a relatively lesser input signal, whereby the sensitivity of the circuit is increased during the wheel balancing process.

6. The circuit as defined in claim 1 further including a capacitor connected in shunt with said meter to damp the oscillatory response of said meter to said input signals.

7. The circuit as defined in claim 1 wherein said reverse-biasing means includes a first battery for reverse biasing said emitter of said transistor and a second battery for reverse-biasing said collector of said transistor, one of said first battery and said second battery comprising a portion of said zero setting means.

8. The circuit as defined in claim 1 wherein said reverse-biasing means includes a first battery and said zero setting means includes a selectively variable resistor in series circuit with said meter, and wherein the series circuit comprising said meter and said variable resistor are connected in parallel with said first battery so that the zero setting of said meter may be adjusted independently from loading on said meter by said transistor.

9. The circuit as defined in claim 8 further including a switch in series circuit with said first battery and said variable resistor.

10. The circuit as defined in claim 9 further including a second battery, and a second switch, said first battery being connected to reverse-bias one of said emitter and said collector of said transistor and said second battery being connected to reverse-biasing the other of said emitter and said collector of said transistor and wherein said second switch is in series circuit with said second battery.

11. The apparatus as defined in claim 1 further including:
    a housing for at least a portion of said circuit;
    a triangular base member;
    an upstanding member secured to said base member; and
    a generally U-shaped member secured to said upstanding member, said housing being located between the opposite legs of said U-shaped member.

12. The apparatus as defined in claim 11 further including a container for housing said source of low level electrical input signals, said container being adapted for location at a point remote from said housing; and
    circuit means in electrical communication with said source in said container and said circuit in said housing.

13. The apparatus as defined in claim 12 further including a magnetic member cooperating with said container so that said container may be secured to a magnetically permeable member at a point remote from said housing.

* * * * *